United States Patent
Kofel

(10) Patent No.: US 10,248,892 B2
(45) Date of Patent: *Apr. 2, 2019

(54) WEB PROCESSING SYSTEM AND METHOD FOR PROCESSING A BASE WEB

(71) Applicant: TEXTILMA AG, Stansstaad (CH)

(72) Inventor: Beat Kofel, Zurich (CH)

(73) Assignee: TEXTILMA AG, Stansstaad (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,266

(22) Filed: Feb. 23, 2018

(65) Prior Publication Data

US 2018/0189616 A1    Jul. 5, 2018

Related U.S. Application Data

(63) Continuation of application No. 15/519,770, filed as application No. PCT/EP2015/071167 on Sep. 16, 2015, now Pat. No. 9,940,555.

(30) Foreign Application Priority Data

Oct. 22, 2014   (EP) .................................... 14189862

(51) Int. Cl.
| | |
|---|---|
| *G06K 21/06* | (2006.01) |
| *G06K 7/08* | (2006.01) |
| *G06K 13/073* | (2006.01) |
| *G06K 19/077* | (2006.01) |

(52) U.S. Cl.
CPC ..... *G06K 13/073* (2013.01); *G06K 19/07749* (2013.01)

(58) Field of Classification Search
USPC ............................... 235/375, 451, 492
See application file for complete search history.

(56) References Cited

U.S. PATENT DOCUMENTS

| | | | |
|---|---|---|---|
| 5,423,617 A | 6/1995 | Marsh et al. | |
| 6,118,467 A * | 9/2000 | Park | B41J 11/0065 347/171 |
| 6,234,693 B1 * | 5/2001 | Gregoire | G07B 17/00508 101/32 |
| 2003/0136503 A1 * | 7/2003 | Green | B32B 37/025 156/264 |

(Continued)

*Primary Examiner* — Tuyen K Vo
(74) *Attorney, Agent, or Firm* — Chang & Hale LLP

(57) ABSTRACT

An RFID label processing system for processing base webs comprises a conveyor device configured to feed a base web along a predetermined conveyor path. The base web includes a sequence of processing segments, with each processing segment forming an RFID label. The processing system further comprises at least two processing modules which are arranged adjacent to the conveyor path, wherein the processing modules are spaced apart by a variable distance. At least one sensor module is configured to determine the position of the processing segments on the base web along the predetermined conveyor path and to output a segment position signal, so that a positioning module that is coupled to at least one of the processing modules and the sensor module may be configured to displace the at least one of the processing modules along the predetermined conveyor path depending on the value of the segment position signal.

15 Claims, 1 Drawing Sheet

(56) References Cited

U.S. PATENT DOCUMENTS

| | | | |
|---|---|---|---|
| 2004/0038789 A1* | 2/2004 | Succi | B65B 41/18 493/29 |
| 2007/0023520 A1* | 2/2007 | Miyashita | G01S 13/825 235/451 |
| 2008/0029221 A1* | 2/2008 | Dangami | B31D 1/021 156/379 |
| 2013/0015959 A1* | 1/2013 | Sano | H04Q 5/22 340/10.51 |

* cited by examiner

WEB PROCESSING SYSTEM AND METHOD FOR PROCESSING A BASE WEB

CROSS-REFERENCE TO RELATED APPLICATIONS

This application is a continuation of U.S. patent application Ser. No. 15/519,770 filed Apr. 17, 2017 and entitled "WEB PROCESSING SYSTEM AND METHOD FOR PROCESSING A BASE WEB," which is a national phase entry of PCT App. No. PCT/EP2015/071167 filed Sep. 16, 2015 and entitled "WEB PROCESSING SYSTEM AND METHOD FOR PROCESSING A BASE WEB," which claims priority to EPO App. No. 14189862.7 filed Oct. 22, 2014 and entitled "WEB PROCESSING SYSTEM AND METHOD FOR PROCESSING A BASE WEB," each of which is expressly incorporated by reference herein in its entirety for all purposes.

TECHNICAL FIELD OF THE INVENTION

The invention pertains to a web processing system and a method for processing a base web, particularly for fabricating labels with electronic functionality such as RFID labels from elastic base webs such as textile substrates.

BACKGROUND

Carriers of RFID labels conventionally consist of paper or plastic material which exhibit an innate resilience to torque, bending and tensile stress. Thus, tolerances are very small and manufacturing of such RFID labels may be performed with very high accuracy.

However, RFID chips have become increasingly useful for labelling textiles, for example clothing or other products made from textiles. In order to ensure their proper functionality such textile RFID labels have to be provided with an RFID transponder chip and a corresponding antenna structure for sending and receiving electrical RFID signals. RFID labels may be manufactured by using an RFID chip and connecting the RFID chip to an electrically conductive strip in a substrate, such as a textile substrate having a metal strip glued to or woven therein.

Particularly textile substrates have a much higher elasticity, flexibility and pliability than corresponding paper or plastic substrates. Moreover, the base material for textile substrates is much more prone to manufacturing tolerances and missing threads.

Thus, there is a need for efficiently and reliably manufacturing RFID labels with a high throughput, particularly on textile substrates, without comprising operational reliability, fidelity and conformity of the produced labels.

SUMMARY OF THE INVENTION

One idea of the present invention is to provide a web processing system that sequentially processes segments of a base web. The base web is conveyed underneath a series of processing modules with different processing functionality.

Each of the processing modules is part of an automatic assembly line that processes semi-manufactured segments of the base web in different assembly stages. In order to be able to guarantee reliable and accurate positioning of each semi-manufactured segment under each of the processing modules the position of each segment as it is conveyed beneath the processing modules is detected. Based on the detected position, lateral misalignments along the conveying path may be compensated for by laterally shifting the position of the processing modules above the base web.

A first aspect of the present invention therefore relates to an RFID label processing system for processing base webs. The processing system comprises a conveyor device configured to feed a base web along a predetermined conveyor path. The base web includes a sequence of processing segments, with each processing segment forming an RFID label. The processing system further comprises at least two processing modules which are arranged adjacent to the conveyor path, wherein the processing modules are spaced apart by a variable distance. At least one sensor module is configured to determine the position of the processing segments on the base web along the predetermined conveyor path and to output a segment position signal, so that a positioning module that is coupled to at least one of the processing modules and the sensor module may be configured to displace the at least one of the processing modules along the predetermined conveyor path depending on the value of the segment position signal.

A second aspect of the present invention relates to a RFID label manufacturing method for processing a base web. The method comprises feeding a base web along a predetermined conveyor path underneath at least two processing modules arranged adjacent to the conveyor path. The processing modules are spaced apart by a variable distance and the base web includes a sequence of processing segments, each processing segment forming an RFID label. Further, the method comprises determining the position of the processing segments on the base web along the predetermined conveyor path by means of a sensor module. Based on the determined position of the processing segments a segment position signal is output which is subsequently used to displace at least one of the processing modules along the predetermined conveyor path depending on the value of the segment position signal.

With the processing system and the method according to the various aspects of the invention it is possible to obtain fast, efficient and reliable sequential assembly of RFID labels on a base web being conveyed beneath a series of processing modules. One of several advantages consists in being able to accurately position the base web despite the base web being elastic and possibly comprising flaws in weaving. Moreover, it is very advantageous that any deviation from the expected position of the segments on the base web may be flexibly and dynamically adapted for by means of repositioning the processing modules and compensating for any detected deviation.

According to an embodiment of the processing system, each of the processing segments may include an RFID antenna woven into the base web with an electrically conductive thread or imprinted on the base web with electrically conductive ink. Base webs for the RFID label production may advantageously be prefabricated with woven antenna threads therein. The position of the RFID antennae beneath the processing modules is most crucial for subsequent processing steps such as RF measurements or writing data to the RFID labels.

According to another embodiment of the processing system, the processing system may further comprise a guide rail to which the at least two processing modules are slidably fastened. In an advantageous variation, one of the at least two processing modules may be fixed in a stationary position adjacent to the conveyor path. This way, the remaining modules may advantageously be positioned relative to the first stationary module. Moreover, the whole processing system then has a reference position for all processing stages.

According to another embodiment of the processing system, the at least two processing modules may comprise at least one of: an automatic RFID chip placement machine, a gluing machine, an RF measurement machine, a printing machine and an RF data transfer machine. Such machinery and apparatuses are often used in RFID label fabrication.

According to another embodiment of the processing system, the at least one sensor module comprises at least one of: a camera, a photodetector, a photoelectric sensor, a capacitive sensor, a Hall sensor, a magnetic sensor, a Doppler radar sensor and an acoustic sensor. Depending on the type, dimensions and material characteristics of the base web and the processing segments to be processed, an appropriate and most reliable type of sensor may be chosen for the sensor module.

According to another embodiment of the processing system, the processing system may further comprise at least one further sensor module attached to one of the processing modules and configured to determine the position of the processing segments on the base web adjacent to the respective processing module and to output a segment position signal to the positioning module of the respective processing module. The further sensor modules may be attached to the processing modules and may be movable along the conveying path together with the processing modules. This may increase accuracy of position detection even further. Additionally, the position of the processing modules may be fine-tuned due to the additional sensor detection at the actual processing region.

According to another embodiment of the processing system, the at least one sensor module may further be configured to determine the length of the processing segments along the base web, and the positioning module may further be configured to displace the at least one of the processing modules along the predetermined conveyor path depending on the value of the determined length of the processing segments. The determination of the length of the processing segments may advantageously account for flaws in weaving.

According to another embodiment of the processing system, the base web may comprise a textile fabric. The whole processing system is particularly useful for elastic and flexible RFID label substrates like fabrics and textile substrates.

According to an embodiment of the method, the method may further comprise determining the length of the processing segments on the base web along the predetermined conveyor path by means of a sensor module, and displacing the at least one of the processing modules along the predetermined conveyor path depending on determined length of the processing segments.

According to another embodiment of the method, the method may further comprise determining the length of a number of processing segments on the base web along the predetermined conveyor path, and calculating the average length of the number of processing segments. In an optional variation thereof, the processing modules may be set to a starting position according to the calculated average length of the number of processing segments. This way, the distance that the processing modules need to be moved between different segments may be shortened, thus saving production time and energy.

According to another embodiment of the method, determining the position of the processing segments on the base web may comprise detecting the position of an RFID antenna woven into the base web with an electrically conductive thread or imprinted on the base web with electrically conductive ink. Alternatively or additionally, determining the position of the processing segments on the base web may comprise optically detecting the position of visual markers on the base web. An antenna thread may serve as reference structure in the processing segments to align the processing modules in an optimum way. However, the use of printed markers on the base web may serve to identify the positions of the processing segments as well.

BRIEF DESCRIPTION OF THE DRAWINGS

The accompanying drawings are included to provide a further understanding of the present invention. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily drawn to scale relative to each other. Like reference numerals designate corresponding similar parts, unless noted otherwise.

Several embodiments of the present invention will be described in more detail with reference to the accompanying drawings in which.

Although specific embodiments have been illustrated and described herein, it will be appreciated by those of ordinary skill in the art that a variety of alternate and/or equivalent implementations may be substituted for the specific embodiments shown and described without departing from the scope and spirit of the present invention. Generally, this application is intended to cover any adaptations or variations of the specific embodiments discussed herein. In particular, specific features, characteristics and properties of different embodiments as discussed hereinbelow may be combined, if not explicitly indicated otherwise.

DETAILED DESCRIPTION OF EMBODIMENTS OF THE INVENTION

Figure 1:
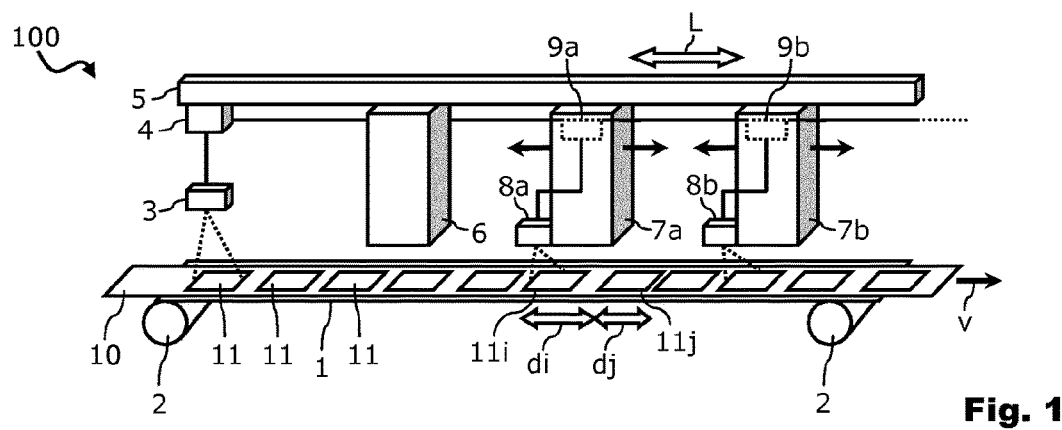
FIG. 1 shows a schematical illustration of a processing system in isometric view according to one embodiment of the invention.

FIG. 1 schematically illustrates a processing system 100. The processing system 100 may particularly be configured to process and produce RFID labels on a fabric or textile substrate. A conveyor device 1 is configured to feed a base web 10 along a predetermined conveyor path which is generally denoted with the reference numeral v in FIG. 1. The conveyor device 1 may in particular have roller means 2 that progressively advance the base web 10 which may be in endless or quasi-endless band or tape form in the direction v.

The base web 10 comprises a sequence of processing segments 11 that are formed on the web with the processing segments 11 being adjacent or bordering each other in the direction of the conveying path v. Each processing segment 11 forms an RFID label. As indicated in FIG. 1, the processing segments 11 may be spaced apart by various distances, depending on the quality of the weaving for a fabric base web and/or the stretch of the base web along the conveying path. For example, the effective length di of the processing segment 11i, i.e. the distance along the base web 10 in the conveying direction v from the leftmost edge of the processing segment 11i to the leftmost edge of the directly following processing segment 11j, may be larger than the effective length dj of the following processing segment 11j. This may be due to the fact that the processing segment 11j is actually shorter than the processing segment 11i, for example because the base web 10 contains weaving flaws in the area of the processing segment 11j. It may also be possible that the weaving strength/density of the base web 10 in the area of the processing segment 11j is higher than in the area of the processing segment 11i so that the tensile force on the base web 10 exerted by the conveying motion of the conveyor device 1 leads to a larger stretching of the base web 10 in the region of the processing segment 11j.

In any case, the distance between two following processing segments 11 may vary along the series of processing segments 11. This potentially creates problems for the processing accuracy of processing modules that are arranged adjacent to the conveyor path v. FIG. 1 schematically illustrates three processing modules 6, 7a and 7b that are spaced apart by a variable distance L. The processing modules 6, 7a and 7b may for example be slidably fastened to a guide rail 5 that extends in substantially the same direction as the conveyor path 4. While one of the processing modules, for example the first processing module 6 in the direction v, may be fixed in a stationary position adjacent to the conveyor path v, the remaining processing modules 7a and 7b may be displaced in a lateral motion by means of positioning module 9a, 9b which are integrated in or connected to the respective processing modules 7a, 7b. The positioning modules 9a, 9b may for example comprise linear motors or stepper motors that are configured to displace the associated processing modules 7a, 7b along the predetermined conveyor path v, as indicated by the arrows in FIG. 1.

Of course, the number of processing modules in FIG. 1 is only exemplarily shown as three and any other number of processing modules may be equally possible. Each of the processing modules may or may not be equipped with a dedicated positioning module. Alternatively or additionally, it may also be possible to provide a central positioning module that is mechanically connected to more than one processing module and that is configured to laterally displace the respective processing modules collectively.

The processing system 100 further comprises at least one sensor module 3 that is arranged near the conveyor device 1. The sensor module 3 is configured to determine the position of the processing segments 11 on the base web 10 along the predetermined conveyor path v. To that end, the sensor module 3 may for example comprise one or more of a camera, a photodetector, a photoelectric sensor, a capacitive sensor, a Hall sensor, a magnetic sensor, a Doppler radar sensor and an acoustic sensor, depending on the type and characteristics of the base web 10. Upon detection of the position of each processing segment 11, the sensor module 3 outputs a segment position signal to a signal processor 4 which may then distribute displacement signals to the positioning modules 9a, 9b of the individual processing modules 7a, 7b. The positioning modules 9a, 9b receive the displacement signals and accordingly displace the processing modules 7a, 7b along the guide rail 5, depending on the segment position signal.

The displacement of the processing modules 7a, 7b will be also made depending on the type of processing functionality that the respective module 7a, 7b is to fulfil: In an exemplarily and usual RFID label manufacturing process, first an RFID antenna is woven into the base web 10 with an electrically conductive thread for each processing segment 11. After that, an automatic RFID chip placement machine places an RFID chip module on the processing segment 11 and electrically connects it to the RFID antenna structure. Following the RFID chip placement, a textile pad may be glued onto the chip module and the antenna structure in order to provide protection against mechanical impact and stress from outside. This may be done in a specific gluing machine. The operable RFID label is then subject to an RF measurement in an RF measurement machine to obtain electrical and electromagnetic characteristics of the label, such as resonance frequency, fidelity or input impedance. Finally, an RF data transfer machine transfers tagging data onto the RFID chip depending on the use and labelling information of the individual RFID label. Additionally, it may be possible to provide a printing machine that may be configured to print designs, trademarks, logos, barcodes or other information on top of the individual RFID labels. The printing machine may also be provided for imprinting antenna structures on the processing segments 11, for example with an electrically conductive ink containing metal particles.

Each of the processing modules 6, 7a, 7b may be embodies as one of the aforementioned apparatuses or machines. Due to the ability to laterally displace the processing modules 7a, 7b individually, it will be possible to accurately position the processing modules 7a, 7b over the individual processing segments. This enables an automatic, reliable and efficient manufacturing of RFID labels, even for flexible, elastic and potentially flawed substrates such as textile fabrics.

Figure 2:
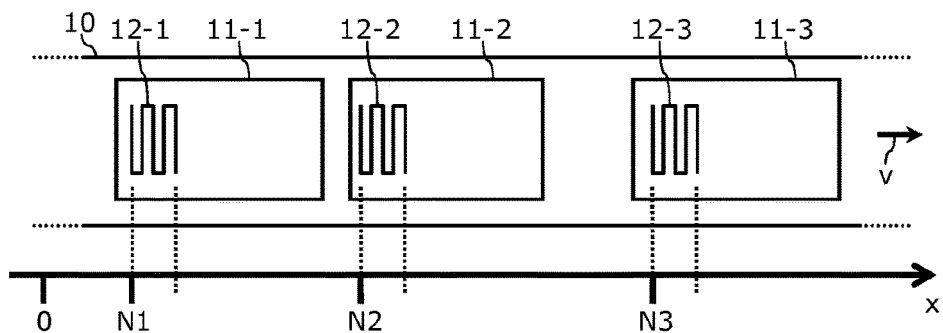
FIG. 2 schematically illustrates a portion of a base web according to a further embodiment of the invention.
Figure 3:
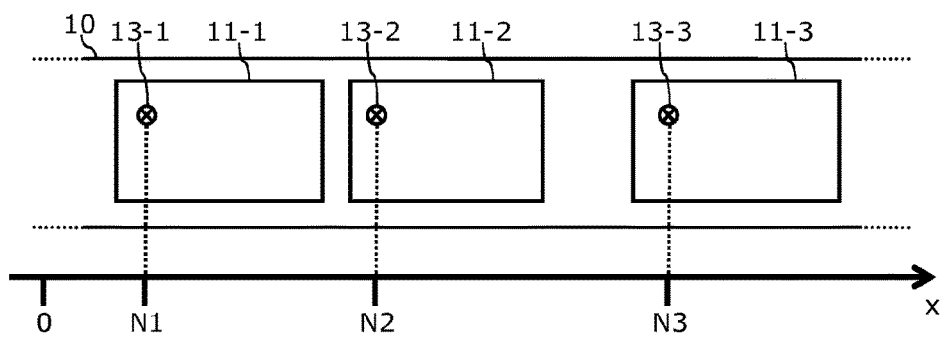
FIG. 3 schematically illustrates a portion of a base web according to another embodiment of the invention.

As shown in FIG. 2 in top view, the base web 10 may comprise a plurality of processing segments 11-1, 11-2, 11-3 which serve as RFID labels and have an antenna structure 12-1, 12-2, 12-3 woven therein. Of course, the antenna structures 12-1, 12-2, 12-3 may also be imparted onto the processing segments 11-1, 11-2, 11-3 by different means, for example by imprinting the structures with electrically conductive ink, by gluing of prefabricated metal structures or similar means. The sensor module 3 may for example detect the exact positions N1, N2 and N3 of the antenna structures 12-1, 12-2 and 12-3 along the conveying direction x and position the processing modules 7a, 7b accordingly. Alternatively or additionally, as illustrated in FIG. 3, each of the processing segments 11-1, 11-2, 11-3 may be imprinted or otherwise tagged with a visual marker 13-1, 13-2, 13-3 which may then serve as a predetermined optical reference feature for the sensor module 3. The sensor module 3 may in this case determine the positions N1, N2, N3 on the basis of the detected positions of the visual markers 13-1, 13-2, 13-3.

The sensor module 3 may for example be arranged at the beginning of the conveyor device 1. In order to fine-tune the positioning of the processing modules 7a, 7b, some or each of the processing modules 7a, 7b may be equipped with further sensor modules 8a, 8b which may be attached to a respective one of the processing modules 7a, 7b. The further sensor modules 8a, 8b may also be configured to determine the position of the processing segments 11 on the base web 10 adjacent to the respective processing module 7a, 7b. Their segment position signals may be directly output to the positioning module 9a, 9b of the respective processing module 7a, 7b in order to laterally displace the processing module 7a, 7b depending on the detected position of the processing segment 11 underneath the processing module 7a, 7b.

The sensor module 3 and the further sensor modules 8a, 8b may also be configured to determine the length of the processing segments 11 along the base web 10. On top of the segment position signal, the sensor modules 3 or 8a, 8b may then output a segment length signal to the positioning modules 9a, 9b to cause the positioning modules 9a, 9b to displace the respective processing modules 7a, 7b along the predetermined conveyor path v depending on the value of the determined length of the processing segments 11.

Figure 4:
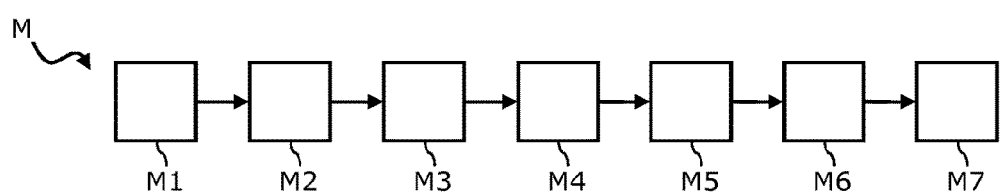
FIG. 4 depicts a functional block diagram of stages in a method for processing a base web according to yet another embodiment of the invention.

FIG. 4 schematically illustrates a block diagram of a method M for manufacturing RFID labels on a base web, such as the base web 10 of FIGS. 2 and 3. The method M may particularly be put into practice with an RFID label processing system, such as the processing system 100 as illustrated in and explained in conjunction with FIG. 1.

In a first stage, the method M may comprise at M1 feeding a base web 10 along a predetermined conveyor path v underneath at least two processing modules which are arranged adjacent to the conveyor path v. The processing modules are spaced apart by a variable distance L. The base web includes a sequence of processing segments, such as the processing segments 11-1, 11-2, 11-3 of FIG. 2 or 3 with each processing segment forming an RFID label. Using a sensor module 3, at M2 the position of each of the processing segments on the base web 10 is determined along the predetermined conveyor path v so that a segment position signal may be output at M3, according to the determined position of the processing segments. The determination of the position of the processing segments may for example be done by detecting the position of an RFID antenna woven into the base web 10, such as antenna structures 12-1, 12-2, 12-3 in FIG. 2 formed with an electrically conductive thread. Alternatively or additionally, it may also be possible to optically detect the position of visual markers on the base web 10, such as the visual markers 13-1, 13-2, 13-3 of FIG. 3.

At M4, one or more of the processing modules may then be laterally displaced along the predetermined conveyor path, depending on the determined position of the processing segments, i.e. the value of the segment position signal. Additionally, in M5, the length of the processing segments on the base web 10 along the predetermined conveyor path v may also be determined so that the displacement of the processing modules may take the actual length of the processing segments into account as well.

For example, in an optional step M7, the length of a number of processing segments 11 on the base web 10 along the predetermined conveyor path v may be determined. To that end, the base web 10 is conveyed with the conveyor device 1 until a certain amount of processing segments have been detected and their respective lengths measured. The overall measured length may be divided by the number of processing segments and the average length of one of the processing segments may be calculated. This specific procedure may be initiated at the start-up phase of the processing system 100 so that the processing modules may be initially calibrated in their position with the calculated average length. The base web 10 is returned after the initial length measurement and the processing modules are set to a starting position according to the calculated average length of the processing segments. Due to the initial calibration procedure the positioning of the processing modules will already be fairly accurate so that only small fine-tuning corrections need to be made for the individual processing segments.

Particular features of an embodiment of the invention may have been disclosed with respect to only one of several implementations, however, said feature may be combined with one or more other features of the other implementations as may be desired and advantageous for any given or particular application. Furthermore, to the extent that the terms "include," "have," "with," or other variants thereof are used in either the detailed description or the claims, such terms are intended to be inclusive in a manner similar to the term "comprise." The terms "coupled" and "connected," along with derivatives may have been used. It should be understood that these terms may have been used to indicate that two components work together or interact with each other, irrespective of whether they are in direct physical or electrical contact or not. Additionally, any terminology used in the foregoing description related to the spatial arrangement of features, elements or components of the embodiments depicted in the drawings, such as "top," "bottom," "left," "right," "lower," "upper" and similar terms, is used solely for purposes of an easier understanding and is not intended to limit the invention in any way.

What is claimed is:

1. A radio-frequency identification (RFID) label processing system for a base web, the system comprising:
   a conveyor device configured to feed a base web along a predetermined conveyor path, the base web comprising a sequence of processing segments, each processing segment forming an RFID label;
   at least two processing modules arranged adjacent to the conveyor path, the processing modules being spaced apart by a variable distance;
   at least one sensor module configured to determine the position of the processing segments on the base web along the predetermined conveyor path and to output a segment position signal; and
   a positioning module coupled to at least one of the processing modules and the sensor module, the positioning module being configured to displace the at least one of the processing modules along the predetermined conveyor path depending on the value of the segment position signal.

2. The RFID label processing system of claim 1, wherein each of the processing segments includes an RFID antenna woven into the base web with an electrically conductive thread or imprinted on the base web with electrically conductive ink.

3. The RFID label processing system of claim 1, further comprising a guide rail to which the at least two processing modules are slidably fastened.

4. The RFID label processing system of claim 3, wherein one of the at least two processing modules is fixed in a stationary position adjacent to the conveyor path.

5. The RFID label processing system of claim 1, wherein the at least two processing modules comprise at least one of: an automatic RFID chip placement machine, a gluing machine, an RF measurement machine, a printing machine or an RF data transfer machine.

6. The RFID label processing system of claim 1, wherein the at least one sensor module comprises at least one of: a camera, a photodetector, a photoelectric sensor, a capacitive sensor, a Hall sensor, a magnetic sensor, a Doppler radar sensor or an acoustic sensor.

7. The RFID label processing system of claim 1, further comprising at least one further sensor module attached to one of the processing modules and configured to determine the position of the processing segments on the base web adjacent to the respective processing module and to output a segment position signal to the positioning module of the respective processing module.

8. The RFID label processing system of claim 1, wherein the base web comprises a textile fabric.

9. The RFID label processing system of claim 1, wherein the at least two processing modules are spaced apart by a variable distance along the predetermined conveyor path.

10. A radio-frequency identification (RFID) label manufacturing method for processing a base web, the method comprising:

feeding a base web along a predetermined conveyor path underneath at least two processing modules arranged adjacent to the conveyor path, the processing modules being spaced apart by a variable distance and the base web comprising a sequence of processing segments, each processing segment forming an RFID label;

determining the position of the processing segments on the base web along the predetermined conveyor path by means of a sensor module;

outputting a segment position signal according to the determined position of the processing segments; and displacing at least one of the processing modules along the predetermined conveyor path depending on the value of the segment position signal.

11. The RFID label manufacturing method of claim 10, further comprising determining the length of a number of processing segments on the base web along the predetermined conveyor path, and calculating the average length of the number of processing segments.

12. The RFID label manufacturing method of claim 11, wherein the processing modules are set to a starting position according to the calculated average length of the number of processing segments.

13. The RFID label manufacturing method of claim 10, wherein determining the position of the processing segments on the base web comprises detecting the position of an RFID antenna woven into the base web with an electrically conductive thread or imprinted on the base web with electrically conductive ink.

14. The RFID label manufacturing method of claim 10, wherein determining the position of the processing segments on the base web comprises optically detecting the position of visual markers on the base web.

15. The RFID label manufacturing method of claim 10, wherein the at least two processing modules are spaced apart by a variable distance along the predetermined conveyor path.

* * * * *